United States Patent [19]
Handa

[11] 3,754,393
[45] Aug. 28, 1973

[54] GAS TURBINE ENGINE COMBUSTOR

[75] Inventor: Noritoshi Handa, Yokohama City, Japan

[73] Assignee: Nissan Motor Company Limited, Yokohama City, Japan

[22] Filed: Oct. 1, 1971

[21] Appl. No.: 185,577

[30] Foreign Application Priority Data
Dec. 5, 1970    Japan.............................. 45/107276

[52] U.S. Cl.............. 60/39.52, 60/39.65, 60/39.66, 431/116
[51] Int. Cl. ............................................ F02c 7/08
[58] Field of Search........................ 60/39.65, 39.52, 60/39.66; 431/116

[56] References Cited
UNITED STATES PATENTS

| | | | |
|---|---|---|---|
| 3,323,304 | 6/1967 | Llobet............................ | 60/39.52 X |
| 3,535,875 | 10/1970 | Sneeden......................... | 60/39.65 X |
| 3,656,298 | 4/1972 | Wade............................. | 60/39.52 X |
| 2,716,330 | 8/1955 | Way................................ | 60/39.65 |
| 3,174,526 | 3/1965 | VonLinde........................ | 431/116 |
| 2,424,765 | 7/1947 | McCollum....................... | 60/39.65 |

*Primary Examiner*—Clarence R. Gordon
*Attorney*— Donal E. McCarthy, William E. O'Brien et al.

[57] ABSTRACT

A gas turbine engine has a combustor having a combustion chamber and an air passage substantially surrounding the combustion chamber and leading from a compressor of the gas turbine engine. The air passage communicates with the combustion chamber through primary and secondary air inlets. A hot gas recirculating passage is formed between the combustion chamber and the air passage, providing communication between the combustion chamber and the primary air inlet. A limited portion of the hot gases produced in the combustion chamber is recirculated to the air inlet through the recirculating passage so as to be cooled by air circulated through the air passage, whereby the maximum temperature of the hot gases is reduced and the recirculated gases are re-burned to remove a combustible content remaining therein.

3 Claims, 3 Drawing Figures

GAS TURBINE ENGINE COMBUSTOR

This invention relates to gas turbine engines and more particularly to a combustor for a gas turbine engine adapted to drive a motor vehicle.

Research and development is made on gas turbine engines in an effort to cope with vehicular air pollution problems. The gas turbine engines in general are capable of completely oxidizing a combustible mixture on a continuous basis and, as such, are adapted to reduce concentrations of noxious compounds such as nitrogen oxides and unburned carbon monoxides in the exhaust gases from vehicle engines. Limitations are, however, encountered in eliminating such noxious compounds to a fully acceptable extent even in the gas turbine engines.

An object of this invention is, therefore, to provide a gas turbine engine which is adapted to minimize the concentrations of the noxious compounds in the exhaust gases.

Another object is to provide a gas turbine engine in which production of nitrogen oxides is reduced to a minimum and, at the same time, the unconsumed combustible compounds such as carbon monoxides are re-oxidized.

Still another object is to provide a vehicle gas turbine engine with an air pollution preventive arrangement which is simple in construction and economical to manufacture.

The invention as hereinafter disclosed in detail contemplates a method for reducing the concentrations of noxious compounds in the exhaust gases from a gas turbine engine, comprising diverting a portion of hot gases produced in a combustion chamber of the gas turbine engine, cooling the diverted hot gases with air which is supplied from a compressor to be mixed with fuel in the combustion chamber, and recirculating the thus relatively cooled hot gases into said combustion chamber whereby the hot gases in the combustion chamber are relatively cooled and a combustible content remaining in the recirculated hot gases is re-combusted in the combustion chamber.

This method can be put into practice advantageously in a gas turbine engine having a combustor which comprises an inner casing defining therein a combustion chamber wherein the inner casing has formed therein a first set of apertures and a second set of apertures which are located downstream of the first set of apertures, an outer casing disposed over the inner casing for defining an air passage which leads from a compressor of the gas turbine engine and which communicates with the combustion chamber through the second set of apertures and through an air inlet port formed in an upstream portion of the inner casing, and an intermediate casing disposed between the inner and outer casings and over the first set of apertures for defining a hot gas recirculating passage which is opened at its end into the air inlet port. A suitable air distributing means may be located at the air inlet port so that the air is directed uniformly and efficiently into the combustion chamber. Such air distributing means may comprise a swirler whereby the air from the air passage is forced to swirl when directed into the combustion chamber. If further desired, a plurality of cooling fins may be interposed between the outer and intermediate casings, namely, in the air passage so as to aid in the cooling of the hot gases which are being passed through the hot gas recirculating passage.

Figure 1:
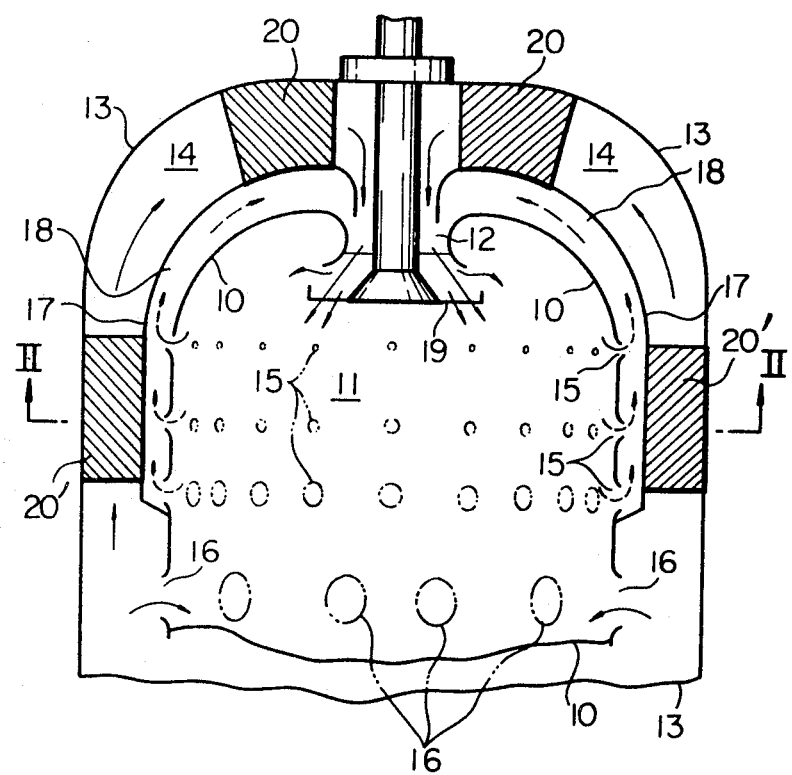
FIG. 1 is a longitudinal sectional view of a combustor to be incorporated in a gas turbine engine in accordance with this invention.

Referring to the drawings, the combustor implementing this invention comprises a generally cylindrical inner casing 10 defining therein a combustion chamber 11. Fuel to produce hot gases is supplied to this combustion chamber 11 in accordance with a prescribed schedule as customary, though not shown. The inner casing 10 has formed at its upstream portion a primary air inlet port 12 through which air under pressure is admitted to the combustion chamber 11. An outer casing 13 is disposed over the inner casing 10, thereby defining an air passage 14. This air passage 14 is led from a compressor (not shown) of the gas turbine engine and is opened at its end into the air inlet port 12. The compressed air supplied from the compressor is passed to the combustion chamber 11 through the air passage 14 and the air inlet port 12, as indicated by arrows in a solid line.

The inner casing 10 has formed therein a first set of apertures commonly designated by 15 and a second set of apertures 16 which are located downstream of the first set of apertures 15. An intermediate casing 17 is disposed between the inner and outer casings 10 and 13, respectively, and over the first set of apertures 15, thereby defining a hot gas recirculating passage 18. The hot gas recirculating passage 18 is opened at its end into the air inlet port 12. The second set of apertures 16, on the other hand, are opened to the air passage 14, providing a plurality of secondary air inlet ports.

In order to have the primary air directed uniformly and efficiently into the combustion chamber 11 through the primary air inlet port 12, suitable distributing means may be located at the air inlet port. Such distributing means may comprise a swirler 19 which is positioned close to an inner end of the air inlet port 12 and which is adapted to force the air from the air passage 14 to swirl when directed into the combustion chamber 11.

In operation, the compressed air supplied to the air passage 14 from the compressor spurts into the combustion chamber 11 through the swirler 19 and mixed with the fuel therein. The mixture of the air and fuel is burned to produce hot motive gases under pressure in the combustion chamber 11. The hot gases are fed to compressor and power turbines (not shown) and are discharged to the open air after driving the turbines. With the arrangement illustrated, a limited portion of the hot gases in the combustion chamber 11 is diverted into the hot gas recirculating passage 18 through the first set of apertures 15. This hot gas recirculating passage 18 is cooled with the air of about 500° to 600°C passing through the air passage 14 which is contiguous therewith. The gases diverted into the hot gas recirculating passage 18 are in this manner cooled to a temperature lower than the combustion temperature of about 300°C while being recirculated through the recirculating passage as indicated by arrows in a broken line. The thus relatively cooled gases are directed into the combustion chamber 11 through the primary air inlet port, causing the maximum combustion temperature in the combustion chamber 11 to lower. The combustible compounds such as carbon monoxides remaining in the recirculated gases are combusted for a second time in the combustion chamber while, due to the reduction in the temperature in the combustion chamber, production of noxious nitrogen oxides is suppressed. The resultant hot gases are diluted and further cooled with the secondary air supplied from the air passage 14 through the second set of apertures 16 whereby the combustion of the hot gases is completed. Addition of the secondary air to the hot gases is conducive, to preventing the turbine blades from being overheated.

In order that the hot gases recirculated through the hot gas recirculating passage 18 be cooled at an increased efficiency, cooling fins 20 and 20' may be mounted in the air passage 14. The number and construction arrangement of such fins may be selected in a suitable manner depending upon the specific operation requirements.

Figure 3:
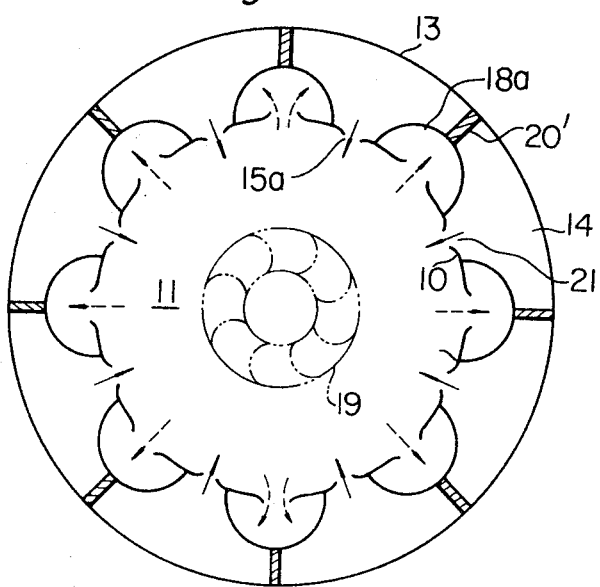
FIG. 3 is similar to FIG. 2 but shows another form of the combustor according to this invention.

Reference is now made to FIG. 3 which illustrates a combustor modified with a view to preventing the inner casing from overheated during operation.

Figure 2:
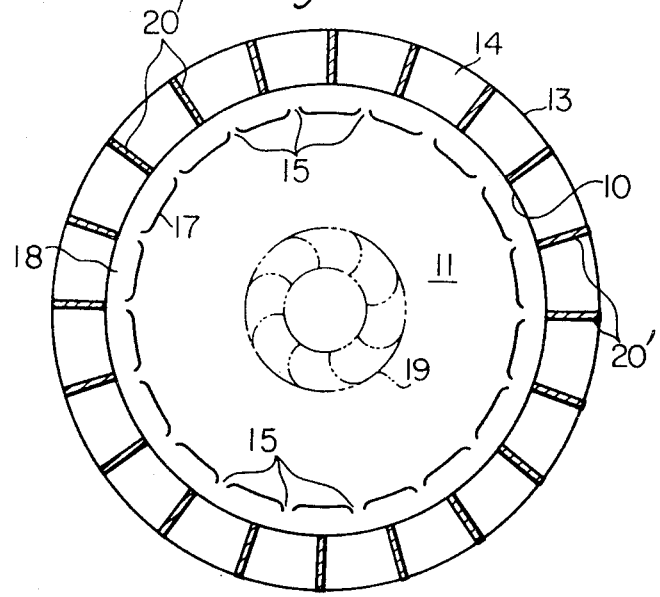
FIG. 2 is a section on line II—II of FIG. 1.

The inner casing 10 of the combustor shown in FIGS. 1 and 2 is subject to the hot gases on its inner and outer surfaces and is consequently heated to extremely high temperatures. To avoid this difficulty, the combustor shown in FIG. 3 has a plurality of circumferentially spaced hot gas recirculating passages which are designated by a common reference numeral 18a. The hot air recirculating passages 18a are lead to the common primary air outlet in which the swirler 19 is located and each of these passages has a generally semi-circular cross section as illustrated. A plurality of apertures designated by reference numeral 15a are formed in the inner casing 10 so as to provide communication between the combustion chamber 11 and the recirculating passages 18a, whereby the hot gases in the combustion chamber is admitted to the recirculating passages as is the case with the combustor of FIGS. 1 and 2. The cooling fins 20' of the combustor thus constructed may preferably be located behined each of these recirculating passages 18a.

Since, thus, the recirculating passages 18a circumferentially spaced from each other, portions of the inner casing 10 intervening between the recirculating passages are in direct contact with the air passage 14 so that the inner casing as a whole is cooled with the air flowing through this air passage and is consequently prevented from being overheated.

To aid in reducing the maximum temperature of the hot gases in the combustion chamber 11, the inner casing 10 may be provided with another set of apertures 21 which are located between the recirculating passages 18a whereby a portion of the air in the air passage 14 is admitted to the combustion chamber before its reaches the primary air outlet port (not shown in FIG. 3).

What is claimed is:

1. A combustor for burning fuel and air mixture, comprising:
   A. an inner casing having a combustion chamber having an inlet port, said inner casing having formed therein a set of apertures opening to said combustion chamber;
   B. an intermediate casing partly enveloping said inner casing for defining between part of said inner casing and said intermediate casing an exhaust gas recirculating space which communicates with said combustion chamber through said apertures and converging to said inlet port;
   C. an outer casing enveloping said intermediate casing for defining between said intermediate casing and said outer casing a compressed air supplying space converging to said inlet port;
   D. a plurality of cooling fins mounted exterior of said intermediate casing and exposed to said compressed air supplying space to conduct heat from said intermediate casing to the air travelling through said compressed air supplying space; and
   E. means for imparting a swirl to the air from said compressed air supplying space and the exhaust gas from said exhaust gas recirculation space.

2. A combustor as claimed in claim 1, wherein said means comprises a swirler located downstream of said inlet port.

3. A combustor as claimed in claim 1, wherein said inner casing further comprises means for supplying air from said compressed air supplying passage to the interior of said inner casing downstream of said combustion chamber to cool the exhaust gas from said combustion chamber.

* * * * *